(12) United States Patent
Baker et al.

(10) Patent No.: US 8,480,253 B1
(45) Date of Patent: Jul. 9, 2013

(54) VEHICLE EXTERIOR LIGHTING SYSTEMS AND METHODS

(76) Inventors: Monsour M. Baker, Orlando, FL (US); Peter F. Reardon, Orlando, FL (US)

(*) Notice: Subject to any disclaimer, the term of this patent is extended or adjusted under 35 U.S.C. 154(b) by 436 days.

(21) Appl. No.: 12/562,408

(22) Filed: Sep. 18, 2009

Related U.S. Application Data

(60) Provisional application No. 61/098,004, filed on Sep. 18, 2008.

(51) Int. Cl.
*F21V 21/00* (2006.01)

(52) U.S. Cl.
USPC .............. 362/249.02; 362/217.1; 362/217.11; 362/217.14; 362/487

(58) Field of Classification Search
USPC ............ 362/249.02, 487, 495–497, 543–545, 362/249.03–249.06, 217.13, 217.11, 217.1, 362/217.14–217.17, 501–503, 505–506, 362/217.12
See application file for complete search history.

(56) References Cited

U.S. PATENT DOCUMENTS

| | | | | |
|---|---|---|---|---|
| 6,158,882 A * | 12/2000 | Bischoff, Jr. | .................. | 362/488 |
| 6,461,028 B1 * | 10/2002 | Huang | .......................... | 362/505 |
| 6,505,963 B1 * | 1/2003 | Chiang | ......................... | 362/545 |
| 6,641,294 B2 * | 11/2003 | Lefebvre | ....................... | 362/544 |
| 6,733,164 B1 * | 5/2004 | Smith, Jr. | ...................... | 362/545 |
| 7,850,349 B2 * | 12/2010 | Ekladyous et al. | ........... | 362/490 |
| 2005/0036327 A1 * | 2/2005 | Patel | ............................. | 362/487 |

* cited by examiner

*Primary Examiner* — Robert May
(74) *Attorney, Agent, or Firm* — Allen, Dyer, Doppelt, Milbrath & Gilchrist, P.A.

(57) ABSTRACT

A device for improving the visibility of an emergency vehicle from the side includes an elongated base having affixed thereto a plurality of lights. The base is affixable to a vehicle side so as to position the lights in a substantially horizontally directed orientation. The lights are powerable via the electrical system of the vehicle, and a switch for activating and de-activating the lights is preferably positioned in the vehicle interior.

10 Claims, 3 Drawing Sheets

VEHICLE EXTERIOR LIGHTING SYSTEMS AND METHODS

CROSS-REFERENCE TO RELATED APPLICATIONS

This application claims the benefit of U.S. Provisional Application Ser. No. 61/098,004, filed on Sep. 18, 2008, the contents of which are herein incorporated by reference in their entirety.

FIELD OF THE INVENTION

The present invention relates to vehicle exterior lighting systems and methods, and, more particularly, to such systems and methods for use with emergency vehicles.

BACKGROUND

Emergency vehicles are typically equipped with lights that serve to inform the public of their status. For example, police vehicles in the United States use flashing blue lights on their roofs, and in some cases on their dashboards. Additional indicators can be provided with flashing headlights and taillights. However, the sides of these vehicles are not equipped with any easily seen warning lights.

The lack of warning indicators on emergency vehicle sides has been known to be at least partially responsible for side, so-called "T-bone," collisions in intersections, if another vehicle is entering an intersection through which the emergency vehicle is passing. Another dangerous position for emergency vehicles is alongside a road, where passing motorists can fail to see the emergency vehicle in time to avoid a collision.

SUMMARY OF THE INVENTION

The present invention is directed to a device for improving the visibility of an emergency vehicle from the side. The device comprises an elongated base having affixed thereto a plurality of lights. The base is affixable to a vehicle side so as to position the lights in a substantially horizontally directed orientation. The lights are powerable via the electrical system of the vehicle, and a switch for activating and de-activating the lights is preferably positioned in the vehicle interior.

The features that characterize the invention, both as to organization and method of operation, together with further objects and advantages thereof, will be better understood from the following description used in conjunction with the accompanying drawings. It is to be expressly understood that the drawings are for the purpose of illustration and description and is not intended as a definition of the limits of the invention. These and other objects attained, and advantages offered, by the present invention will become more fully apparent as the description that now follows is read in conjunction with the accompanying drawings.

DETAILED DESCRIPTION OF PREFERRED EMBODIMENTS

Figure 1:
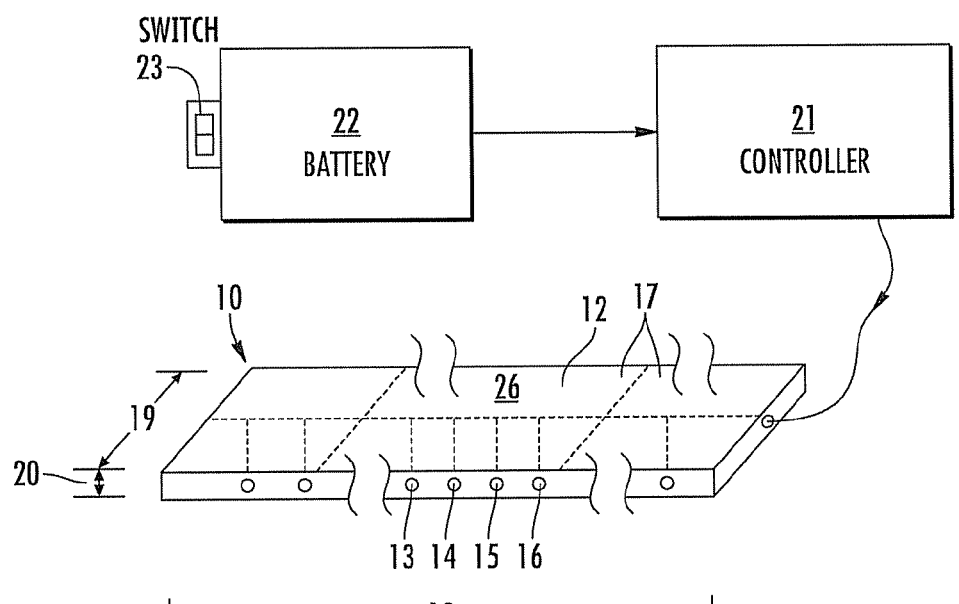
FIG. 1 is a schematic diagram of a circuit for providing power to a lighting device of the present invention.
Figure 2:
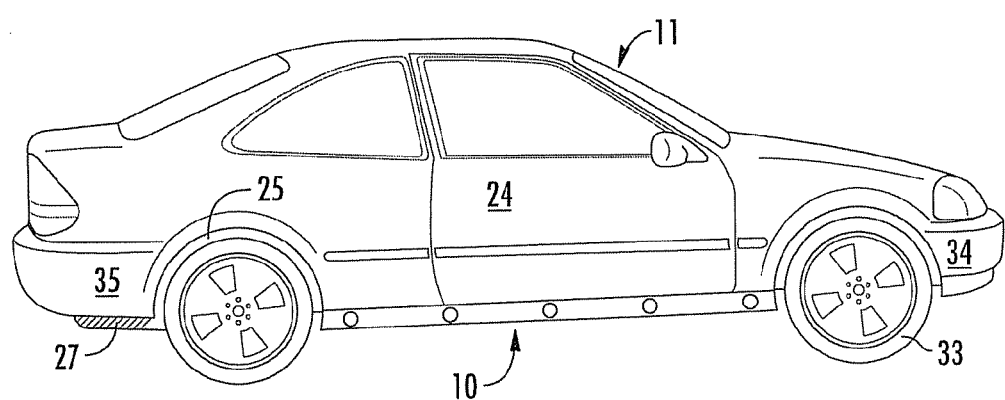
FIG. 2 is a side view of the lighting device affixed to a vehicle.

A description of the preferred embodiments of the present invention will now be presented with reference to FIGS. 1 and 2.

The present invention is directed to a device 10 for improving the visibility of an emergency vehicle 11 from the side. The device 10 comprises an elongated base 12 having affixed thereto a plurality of lights 13-16. The base 12 can comprise one or more strip modules 17 oriented in series to achieve an exemplary length 18 of 6 feet, although this is not intended as a limitation. The base 12 can have a width 19 in a particular embodiment of 1 in. A height 20 of the base 12 is preferably less than 1 in., and may have a lower limit imposed by the size of the lights 13-16 used.

The lights 13-16, which may comprise, for example, LEDs, are powered through a control box 21 positioned in the vehicle 11 by the vehicle battery 22. The control box 21 comprises an activation switch 23 for use by a vehicle occupant as desired.

The base 12 is affixable to a vehicle side 24, and preferably to both sides 24, so as to position the lights 13-16 in a substantially horizontally directed orientation. In a particular embodiment, the base 12 is affixable in substantially bridging relation between the vehicle's wheel wells 25. In particular, a top face 26 of the base 12 can be affixable to an underside of the vehicle chassis 27.

Among the benefits of the substantially horizontal orientation of the lights 13-16 is the increased brightness afforded thereby. In contradistinction to accent lights such as are mounted to vehicles that are oriented downward for the purpose of providing a "glow," the lights 13-16 of the present invention are intended to be sufficiently bright to alert those external the vehicle 11 of the presence thereof.

At least some of the lights 13-16 can be in certain embodiments separately addressable to create desired illumination patterns. In a particular embodiment, the lights 13-16 can be configured in alternating pairs, so that an "on-off" alternating sequence can be achieved to denote a "police pattern." That is, while lights 13,15 are on, lights 14,16 are off, and vice versa, in a continuously flashing pattern. Typically, these lights 13-16 have a blue color. One of skill in the art will recognize that such a pattern and color is not intended as a limitation, and that any pattern or color could be envisioned for use by different type vehicles, and even for the same type vehicle in different circumstances.

In alternate embodiments, additional devices could be positioned to extend farther along the vehicle side, for example, behind the vehicle wheels 33 and/or along the front 34 and rear 35 portions of the vehicle sides 24, as well as to locations along the front and rear of the vehicle 11.

Figure 3:
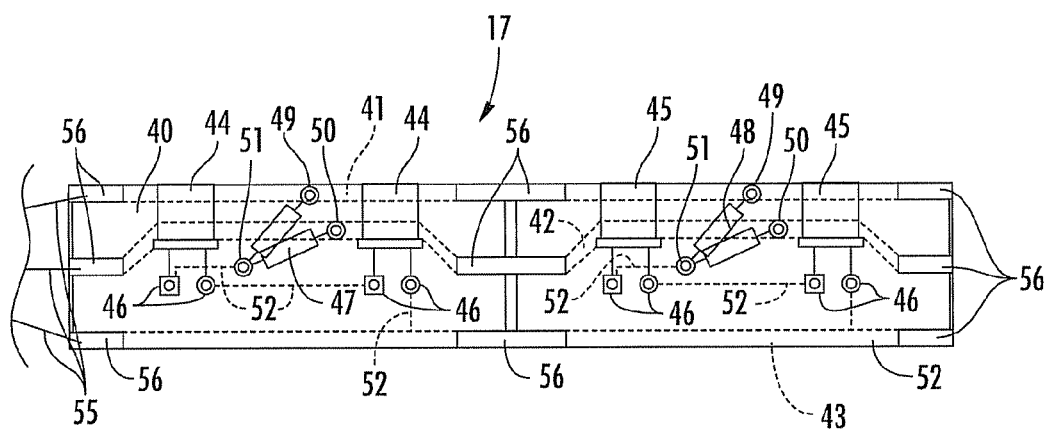
FIG. 3 is a schematic diagram of strip modules of the circuit of FIG. 1.

According to an aspect of the invention, referring to FIG. 3, the strip module 17 includes a printed circuit board 40, preferably including a flexible fiberglass substrate with linearly extending printed conductors forming power connections 41, 42 and a common ground connection 43. Lighting element connection locations 44, 45 for LEDs or other lighting elements, are indicated (for instance, as part of the screen printing over circuit board 40) on the board 40 adjacent terminal vias 46. Resistor connection locations 47, 48 for resistors are also indicated. Each connection location 47, 48 has alternate first terminal vias 49, 50 and a single second terminal via 51. Further printed conductors are formed on the circuit board 40 for serial connections 52 between the lighting elements for each connection location 44, 45 and the common ground connection 43.

In use, lighting elements, such as the lights 13-16, are attached at the connections locations 44, 45, for instance, by soldering. Each pair of connection locations 44, 45 can be readily associated with different power connections 41, 42 by appropriately connecting resistors at the resistor connection locations 47, 48. For instance, by using the vias 49, 51 at the resistor connection location 47, the lights at locations 44, 45 will be associated with the power connection 41. By using the vias, 50, 51 at the resistor connection location 48, the lights at locations 44, 45 will be associated with the power connection 42. Thus, by differently controlling the power supply from the battery 22 to the power connections 41, 42, the controller 21 can generate more complex visual effects.

To make external power connections to the circuit board 40 with the controller 21, leads 55 are connected to the power connections 41, 42 and ground connection 43 at any of a one plurality of corresponding exposed areas 56. Preferably, exposed areas are located adjacent each set of connection locations 44, 45. This allows the circuit board 40 to cut to a desired and/or soldered to an adjacent circuit board between connection locations.

In FIG. 3, the circuit board 40 is shown with two pairs of lighting element connection locations 44, 45. It will be appreciated that the circuit board 40 could be formed with a much larger number of connection locations. As described above, the circuit board 40 can be readily cut to a desired number of locations and can also be joined with additional circuit boards to achieve a desired length. Preferably, the circuit board 40 is formed to permit substantially flexing along its length. Preferred layers of the circuit board 40 include a non-conductive substrate, such a fiberglass or resin layer, a copper layer including the various connection, and a non-conductive silk screen layer applied over the copper layer to which text and indications can also be applied. A non-reactive, conductive layer is preferably applied over the exposed areas 56 and around vias 46, 49, 50, 51. However, it will be appreciated that alternate circuit board structures can be used. For example, it will be appreciated that surface connections could be used rather than vias.

Figure 4:
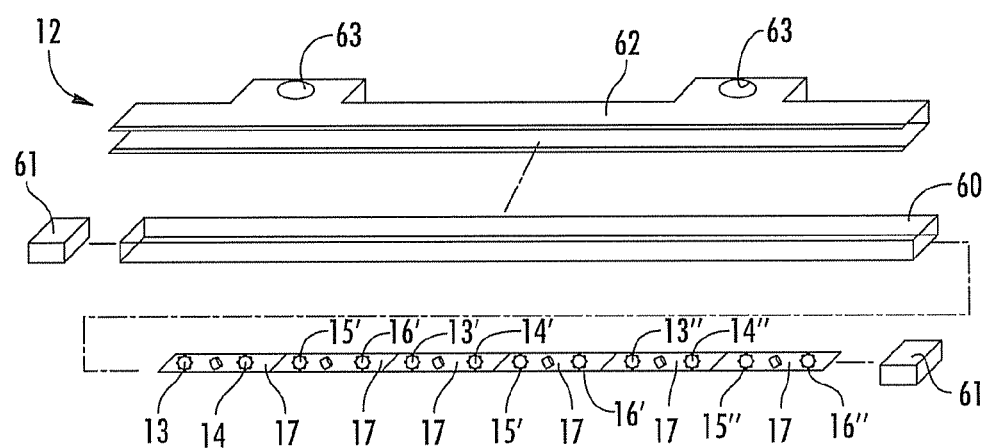
FIG. 4 is a exploded perspective view of the lighting device.

Referring to FIG. 4, according to another aspect of the present invention, the base 12 includes the strip modules 17 inserted inside a clear housing 60. The housing 60 can be formed, for instance, as an extruded acrylic tube. End caps 61 are sealingly inserted into opposite ends of the housing 60. Leads from the strip module 17 (see FIG. 3) can be led through a hole drilled into one of the end caps 61. Preferably, the leads are grouped into a single sheath and any such hole is sealed around the sheath. The housing 60 is slid into a channel of a mounting bracket 62. The mounting bracket 62 includes one or more mounting holes 63 to facilitate attachment to the underside of the vehicle 11.

Figure 5:
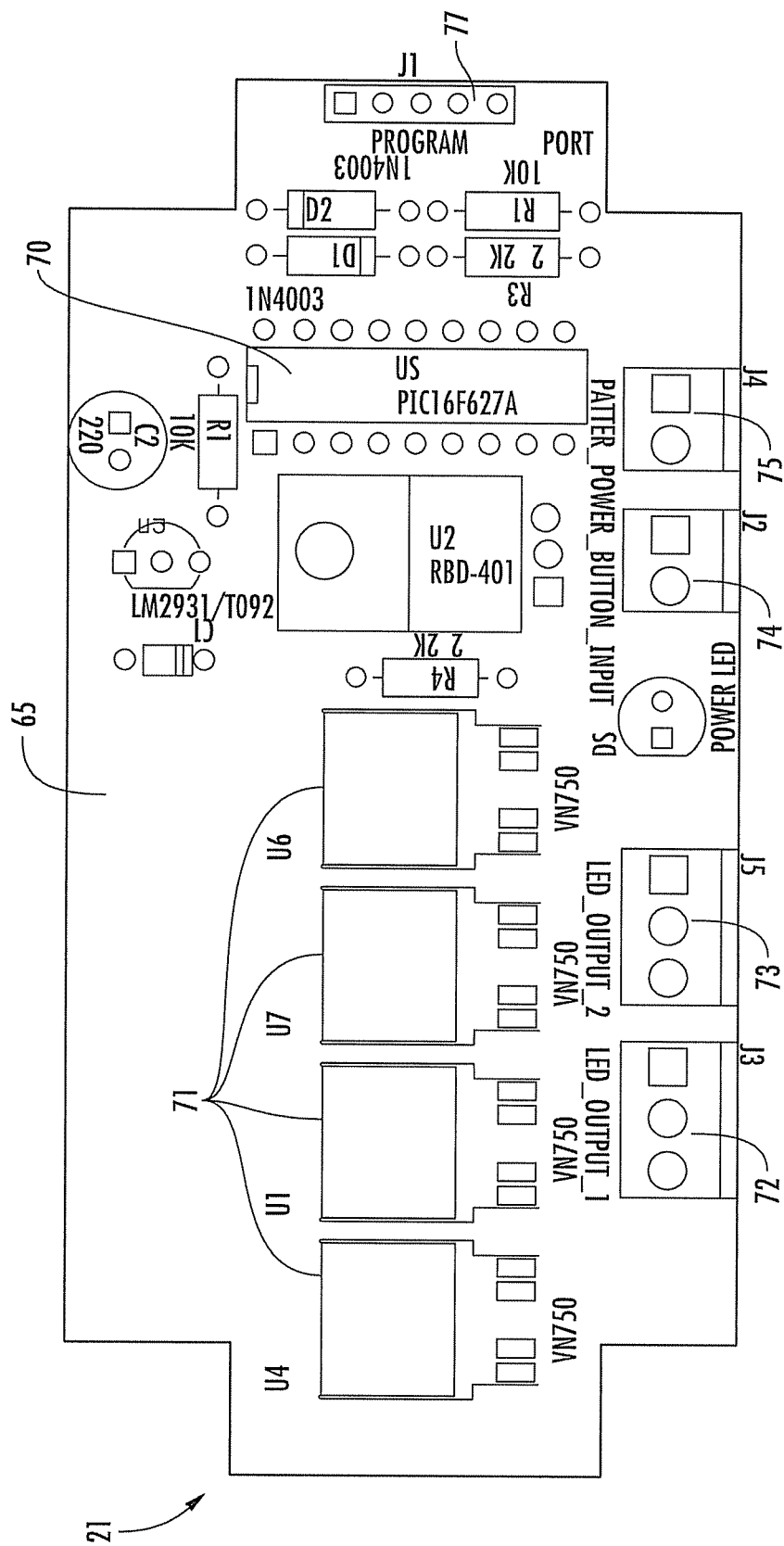
FIG. 5 is a schematic diagram of a controller for the lighting device.

Referring to FIG. 5, according to a further aspect of the present invention, the controller 21 includes a circuit board 65 with a programmable microprocessor 70 adapted to control a plurality of switching devices 71, such as gated transistors, to selectively power a plurality of outputs 72, 73 (connected, for example, to power connections 41, 42). The microprocessor 70 accepts a power input 74 and a pattern selection input 75. The power input 74 allows power to the lighting device to be secured altogether and the pattern selection input 75 allows various flashing, occulting or other patterns to be selected. Additionally, a programming input 77 allows additional patterns to be loaded for use by the microprocessor 70. It will be appreciated that inputs could be wired and/or remote. Additionally, optical or other isolation could be employed to separate power electronics from control electronics.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction and use.

What is claimed is:

1. A vehicle lighting system comprising:
   a housing defining an interior volume with at least one opening at an end thereof, the housing being elongated in a length direction;
   a bracket adapted for mounting to a vehicle and defining a channel in which the housing is closely accommodated, the channel having an open side, the bracket, channel and open side all being elongated in the length direction, the open side defining an open side plane;
   a circuit board arranged within the housing, the circuit board being elongated in the length direction, a mounting surface of the circuit board defining a circuit board plane, the circuit board plane being perpendicular to the open side plane; and
   a plurality of light emitting diodes mounted to the mounting surface of the circuit board within the housing and oriented parallel to the circuit board plane to transmit light out of the open side of the channel.

2. The system of claim 1, wherein the circuit board is a printed circuit board and includes a plurality of printed conductors extending along the circuit board and forming electrical power connections for the plurality of the light emitting diodes.

3. The system of claim 2, wherein the plurality of printed conductors include first and second power connections and a common ground connection, a first portion of the plurality of light emitting diodes being connected between the first power connection and the common ground connection and a second portion of the plurality of light emitting diodes being connected between the second power connection and the common ground connection.

4. The system of claim 3, wherein the plurality of light emitting diodes are arranged in pairs of diodes, each pair of diodes being commonly connected to one of the first and second power connections by a respective resistor.

5. The system of claim 2, wherein electrical wiring is connected to the printed circuit board at exposed areas of the printed conductors adjacent to the at least one opening of the elongated housing.

6. The system of claim 1, further comprising at least one end cap sealing the at least one opening.

7. The system of claim 1, wherein the elongated housing is an extruded clear plastic tube.

8. The system of claim 1, wherein the channel has a substantially U-shaped cross-section, the open side being formed by an open end of the U.

9. The system of claim 1, further comprising a controller external to the housing and selectively powering the plurality of light emitting diodes.

10. The system of claim 9, wherein the plurality of light emitting diodes are divided into at least first and second portions connected to respective first and second power connections, the controller being configured to separately power the first and second power connections to generate a plurality of lighting patterns.

* * * * *